Sept. 28, 1971   K. VOLLENWEIDER ETAL   3,608,370
MEASUREMENT TRANSDUCER
Filed March 25, 1969   3 Sheets-Sheet 1

Inventors
KURT VOLLENWEIDER
HANS C. SONDEREGGER

By Craig, Antonelli, Stewart & Hill

Attorneys

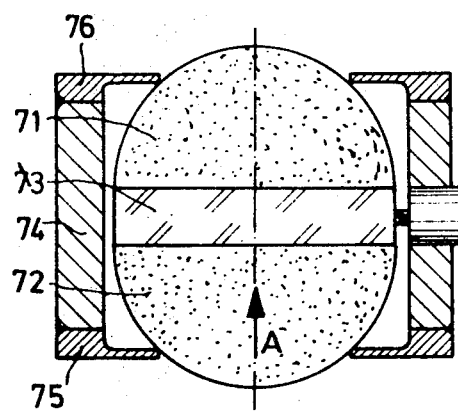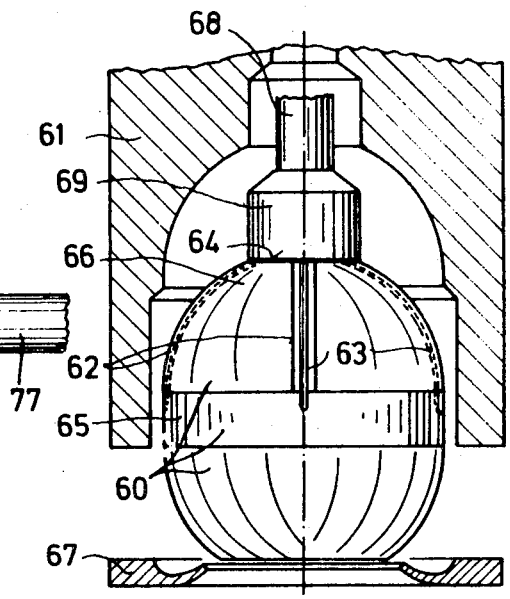
Fig. 7
Fig. 6

United States Patent Office 3,608,370
Patented Sept. 28, 1971

3,608,370
MEASUREMENT TRANSDUCER
Kurt Vollenweider, Winterthur, and Hans C. Sonderegger, Neftenbach, Switzerland, assignors to Kistler Instruments AG, Winterthur, Switzerland
Filed Mar. 25, 1969, Ser. No. 810,253
Claims priority, application Switzerland, Mar. 25, 1968, 4,491/68
Int. Cl. G01l *1/16*
U.S. Cl. 73—141R                   8 Claims

ABSTRACT OF THE DISCLOSURE

The measuring transducer for measuring physical properties such as force, pressure and acceleration employs a spherically shaped force transmitting member disposed adjacent to the measuring element supported within the transducer housing. A ring-shaped diaphragm is provided to force bias the member and to permit rocking movement thereof in a direction depending upon the relative position of the bearing surface of the pressure transmitting member and the measuring element.

---

Figure 1:
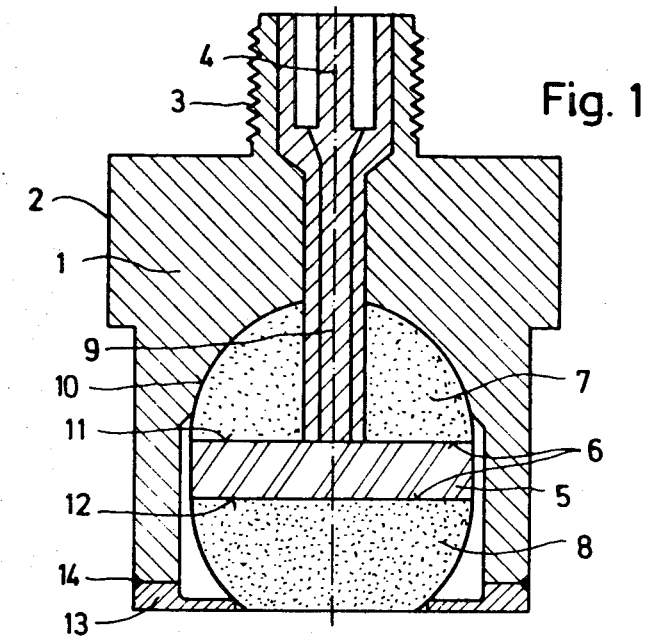

The present invention relates to measurement transducers for determining physical properties such as pressure, force and acceleration by dynamic or static procedures, and for this purpose piezo-electric, piezo-resistive, strain gauge strip, and other measuring systems are used. In all these cases the physical properties to be measured, whether pressure, force or acceleration, must be introduced in a suitable way into the measuring element which effects the true conversion into an electric measuring signal. For this purpose it is necessary in the first place to isolate the measuring element from the surroundings so that only the forces to be measured can act thereon. All other local influences such as temperature, humidity, corrosive gases and so on should be isolated from the true measuring element. This is necessary since the measuring elements themselves are highly sensitive. sophisticated components which must be treated as carefully as possible.

In all existing measuring transducers the physical properties to be measured are converted into a force which must be transmitted as uniformly as posible to the measuring element as a force acting on the surface. The measuring element is advantageously arranged as a cylindrical assembly in which the application of the force is effected on the two flat faces. The electrical connections can either be led through the flat faces or through the peripheral faces of the cylinder. It is of no importance for the present invention whether the measuring element is a piezo-electric, a piezo-resistive or a strain gauge strip element. In all cases the cylindrical assembly is arranged in the transducer in such manner that the force application surfaces of the measuring element receive no flexure during installation and in operation but that only forces along the axis of the cylinder act on the element. The application of the force to the element must consequently be obtained by means of a plate located entirely in a plane parallel to the force transmission which is displaced from the outside by the action of the forces absolutely parallel to the application surfaces concerned.

Additionally, the pressure distribution transfer element must be sealed off satisfactorily from the outside; this was previously done generally by a metal diaphragm. With commercially available measurement transducers the application surfaces for the measuring elements are machined directly in the measurement transducer either by lapping or fine turning. The pressure transmitting plate is inserted after insertion of the measuring element into the transducer casing and with known constructions, this plate generally consists of a cylindrical disc which is placed under pre-stressing by known means in order that the parts do not come out of engagement under operating conditions. Plates, springs or thin-walled tubular springs are used as the pre-stressing elements which act on the pressure plate. The accuracy obtainable in this way is, however, inadequate since it is extremely difficult to produce accurately flat bearing surfaces in the bore of a transducer.

A further difficulty consists in providing that the pre-stressing force of the said means acts exactly parallel over the whole surface of the measuring element. Further, the externally acting physical properties, which must be converted into a pressure force distributed uniformly over the working face, involve great difficulties. Finally, it should be noted that, during the action of the measuring forces, deflection of the bearing surface of the measuring element as well as the pressure transmitting plate must be avoided if accurate measuring results are to be obtained.

The present invention permits the aforesaid difficulties to be eliminated as far as possible. It relates to a transducer for measuring physical properties in which the forces introduced into the measuring element of the transducer are transmitted to the measuring element by means of a pressure-transmitting element resting on the measuring element. The present invention is characterized by the fact that the pressure-transmitting element has a ball or spherically-shaped surface which is surrounded by a sealing member which permits a swing movement of the pressure transmitting element to suit the opposed positions of the bearing surfaces of the pressure transmitting element and the measuring element.

Conveniently the seating member may be arranged as a ring-shaped diaphragm connected at its outer periphery to the casing of the transducer and which rests at its inner periphery in sealing manner on the ball-shaped outer surface part of the pressure-transmitting element. In a particularly desirable construction the seating member may exert a force on the pressure-transmitting element which serves for pre-stressing the measurement element. Semi-spherical surfaces can be produced in a comparatively simple way having an accuracy sufficient for the present purpose, and it is therefore desirable for the pressure-transmitting element to be of semi-spherical shape. Further preferred embodiments are dealt with below in conjunction with the description of preferred examples.

The construction of a transducer according to the present invention permits an exactly parallel pre-stressing of the measuring element to be obtained under all conditions. Furthermore, a satisfactory application of the forces parallel to the axis is permitted.

By choosing suitable materials the semi-spherical bearing and force-transmitting elements can be adapted to the physical requirements of the interposed measuring element, especially as regards the coefficients of expansion, electrical conductivity or insulation properties and also stiffness.

Figure 2:
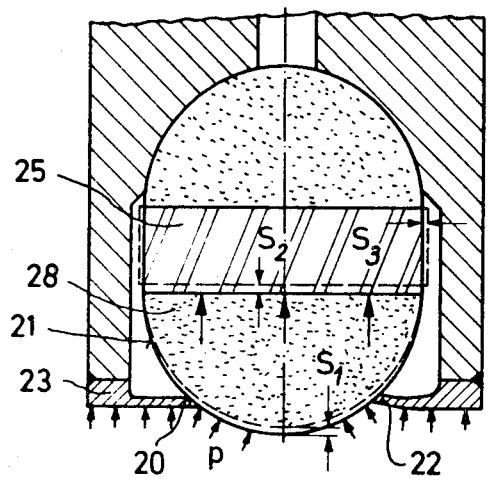
Figure 3:
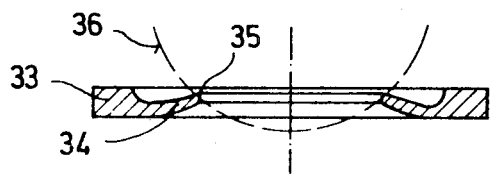
Figure 4:
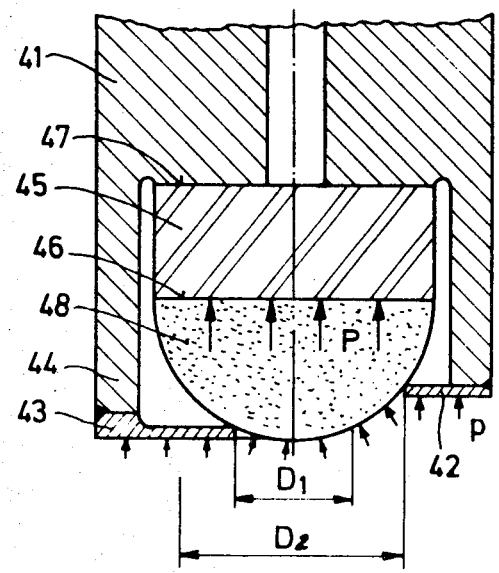
Figure 5:
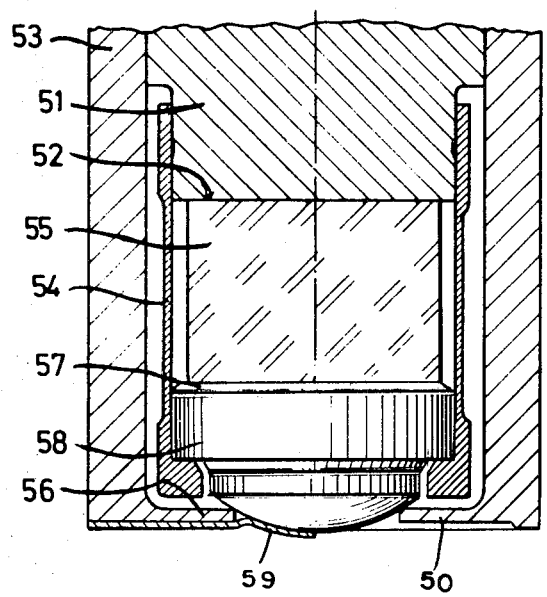

The features of the present invention and methods of application are described hereinafter on the basis of the constructional examples shown in the drawings in which:

FIG. 1 shows in cross-section a pressure transducer with semi-spherical pressure-transmitting elements and bearing elements and an interposed pressure measuring element, FIG. 2 is a cross-section through the pressure-sensitive part of a measurement transducer according to FIG. 1, FIG. 3 shows the seating part of the ring-shaped diaphragm for a ball-shaped pressure-transmitting surface before assembly in the transducer, FIG. 4 shows a pressure-sensitive part of a measurement transducer in which two different conversion ratios between pressure and force are indicated, FIG. 5 shows a modification of a measurement transducer in which the mechanical pre-stressing is obtained by means of a thin-walled tubular spring, FIG. 6 shows an assembly of a tranducer casing with a measuring element arranged as an insert unit, and FIG. 7 shows a further application of semi-spherical pressure transmitting elements together with seating members in the form of ring-diaphragms.

FIG. 1 shows a pressure measuring transducer consisting of a transducer body or housing 1 with a mounting flange 2 and a screw thread 3 for a connector plug. A connecting socket 4 can be of the single pole or multipole type according to the measurement element 5 in use. The measuring element 5 which consists of a cylindrical body with exactly flat end faces 6 is installed between a semi-spherical bearing element 7 and a semi-spherical pressure-transmitting element 8. The bearing element 7 can be provided with a bore 9 for receiving the electric connections to the measuring element 5. A semi-spherical outer surface 10 in the transducer body 1 is advantageously preliminarily machined and then finished by lapping or cold pressing. The semi-spherical bearing element 7 fits exactly into this socket face 10 and permits the flat face of the semi-spherical bearing element to center itself freely. The semi-spherical pressure-transmitting element 8 also comprises a flat worked face 12. It is pressed by a sealing element 13 acting as a seating for the element 8 to be pressed against the measuring element 5 under mechanical pre-stressing. The sealing element 13 forms a ring-shaped diaphragm and is fixedly connected to the transducer body 1 by welding at 14.

FIG. 2 shows a pressure transducer where the function of the sealing element 23 is shown in particular. The measuring element 25 is compressed by an amount S2 by the action of the pressure p on the sealing element 23 forming the seating for the pressure-transmitting element 28 as well as on the semi-spherical pressure-transmitting element 28 itself. This compression produces a transverse expansion S3 which must be effected completely unrestrained. The spherical outer surface 21 of the pressure-transmitting element 28 is highly polished and spherical. The sealing edge 20 pressed on this outer surface has a circular shape by lapping or pressing against a spherical outer surface. It remains in permanent contact with the spherical outer surface 21 by its elastic construction. The contact pressure produced by the pre-stressing is further increased by the external pressure force p so that satisfactory sealing is obtained under all operating conditions. This is also the case if displacement of the spherical surface 21 occurs as a result of the measuring procedure as indicated at S1. The sealing edge 20 then slides into the position 22. The design is such that the yield movement S1 due to the loading is kept as small as possible by corresponding selection of the elasticity properties of the pressure measuring element 25. In the case of piezo-electric measuring elements this movement can be kept within the range of several $\mu$m.

FIG. 3 shows the sealing diaphragm 33 in the condition before assembly. The elastic sealing lip 34 can be slightly curved by pressing or machining. The sealing edge 35 is fitted accurately by known means to the outer spherical surface 36 of the ball.

FIG. 4 also shows the measuring end of a pressure transducer in which the transmission ratio of the outer pressure p to the inner pressure force P can be varied by selecting a suitable diameter D1 or D2 for the sealing edge. If the sealing element 43, which is in the form of an annular diaphragm, has a diameter D1, the greater part of the pressure forces p are transmitted to the hollow cylindrical part 44 of the transducer 41 and the smaller part to the semi-spherical pressure-transmitting element 48. The semi-spherical form of this pressure-transmitting element 48 permits a uniform superficial pressure P to act on the whole surface 46 of the pressure element 45. By increasing the diameter of the sealing edge to D2 as in the case of the element 42, the greater part of the external forces p is transmitted to the pressure transmitting element 48. In this way it is possible to adapt the pressure range p to be measured in a simple way to the properties of the measuring element 45. The bearing surface 47 is, in this example, received directly as a flat face in the transducer body 41. This constructional arrangement may be advantageous if the construction is such that there are no possibilities of flexure as a result of clamping forces on the face 47. If this possibility should arise however, as in the case of FIG. 1, the bearing face 47 can be isolated by means of a semi-spherical bearing element.

In the construction according to FIG. 5 a known bearing element 51 is provided with a flat bearing face 52 and installed in the tubular part 53 of the transducer. The measuring element 55 is subject to mechanical pre-stressing by means of the pressure-transmitting head 58 in the form of a spherical body and the pre-stressed tubular spring 54. A socket housing in a flanged part 56 provides a seating for the pressure transmitting element 58 and permits accurate parallelism between the faces 52 and 57 of the pressure element 55. For sealing purposes a diaphragm 59 may extend over the whole outer surface of the transducer and is welded to the tubular body 53. However, obviously a sealing element 50 in the form a ring-shaped diaphragm can be used which is sealed to the spherical surface by means of a sealing edge.

FIG. 6 shows the mounting of a self-contained measuring unit 60 in the open end part 61 of a transducer. In this example the electric connections of the measuring elements 65 are led out along the peripheral surface and are fitted in meridian grooves 62 of the semi-spherical bearing element 66. If the latter is formed of non-conductive material the connection 63 may be made by means of metallised silver coatings or coatings of other evaporated conductive metals on the connecting surface 64. Connections are taken from these connecting surfaces by means of the connecting plug 69 to the cable connections 68. All these parts are assembled in advance and the pressure-transmitting element is advantageously soldered, brazed or welded to the measuring element or connected by other means. The unit is fitted into the open end of the transducer body 61 whereupon the sealing element 67 forming a seating for the pressure-transmitting element is welded to the tubular end of the transducer 61 under pre-stressing.

A further constructional example is shown in FIG. 7 and relates to a spherical pressure measuring element. Both force and pressures can be measured directly with this transducer which consists of two symmetrical semi-spherical pressure-transmitting elements 71 and 72, a pressure measuring element 73, a ring-shaped transducer body 74, two symmetrically arranged seating members 75 and 76, for the pressure transmitting element, which are of ring diaphragm shape and engage the measuring unit under mechanical pre-stressing by the sealing lips thereof. The signal output connection 77 is fitted laterally to the transducer casing 74 but it can also be arranged in the axial direction through one of the semi-spherical elements 71 and 72. The pressure transducer formed in this way can also be used directly for differential pressure measurement wherein the two pressure media are fed directly to the surfaces of the ring diaphragms. By reason of the resilient mounting of the symmetrical system the holder is also compensated as regards acceleration. If in fact acceleration is applied in the axial direction A, one-half sphere exerts a load on the measuring elements 73 while the other releases the load to the same amount on the assumption that the two parts 75 and 76 have equal elastic properties. The new transducer thus offers valuable properties which are obtained by simple means.

Apart from the advantages already referred to due to the geometrical shape of the pressure-transmitting element and the associated sealing elements in the form of ring-shaped diaphragm seating members, further substantial advantages are obtained by appropriate choice of the materials for the pressure-transmitting elements. For many purposes it is desirable that the measuring elements shall be arranged so as to be completely isolated electrically from the transducer body. Then ceramic materials of the aluminium oxide type are preferred since they have at the same time a great mechanical compression strength, great rigidity and satisfactory spherical surfaces; also sapphire and ruby can be considered for this purpose. In applications where severe requirements are involved as regards the heat insulation of the transducer elements, the pressure transmitting elements may consist of quartz glass or other glass-like products. In these cases they have at the same time good electrical insulating properties.

If the elements are subjected also to the requirements as regards linear co-efficients of expansion, as is desirable for example when using piezo-electric elements, it is possible to form the pressure-transmitting elements directly of piezo-electric materials. If necessary, the outer surfaces of such piezo-electric elements are metallised so that no charges can arise as a result of the pressure forces. In case where greater importance arises as regards impact strength, for example in the case of acceleration measurements, the pressure-transmitting elements may be produced from hardened steel or hard metal. In particular cases these elements may also be formed of synthetic resins or natural types of stone.

The invention offers now possibilities in the construction of measurement transducers. It is independent of the type of transducer element used and can be employed for pressure, force and acceleration transducers. The properties of the pressure-transmitting elements permit a self-compensating arrangement of the contact bearing surfaces of the measuring transducer, and a complete sealing even under difficult operating conditions in conjunction with the ring-shaped diaphragm seating members proposed. The removability of the highly accurate flat bearing surfaces from the transducer body permits the machining of the surfaces on optical work machines whereby satisfactory flatness can be attained. By corresponding arrangement of the sealing elements the measuring element can be adapted in a simple way to a wide range of requirements in that the pressure-transmitting ratio can be varied within wide limits. The separation of the bearing element from the measurement transducer enables the inserted pressure elements to have favorable properties in relation to external physical effects by the selection of appropriate materials. In particular by the choice of appropriate materials of the bearing and pressure-transmitting elements the result is secured that the measuring elements can be stressed in a flat and parallel way with low distortion and that the temperature gradients can be largely reduced.

While we have shown and described several embodiments in accordance with the present invention it is understood that the same is not limited thereto but is susceptible of numerous changes and modifications as known to a person skilled in the art, and we therefore do not wish to be limited to the details shown and described herein but intend to cover all such changes as are within the scope of those skilled in the art.

We claim:
1. A measuring transducer for measuring forces which represent physical properties comprising:
   a housing;
   a force measuring element supported within said housing;
   a pressure transmission member for transmitting forces to be measured to said measuring element, said pressure transmission member having a flat surface portion contacting said measuring element and a spherically shaped surface portion extending from one end of said housing for receiving said forces; and
   a first ring-shaped diaphragm connected at its outer periphery to said housing and having its inner periphery in sealing engagement with said spherically shaped surface portion of said pressure transmission member, said first ring-shaped diaphragm exerting a biasing force on said pressure transmission member to pre-stress said measuring element.

2. A measuring transducer according to claim 1, wherein said pressure transmission member is semi-spherically shaped.

3. A measuring transducer according to claim 2, further including a tubular spring having a flanged end with a spherical seat thereon, said tubular spring being supported within said housing for holding said pressure transmission member and for pressing said pressure transmission member against said measuring element.

4. A pressure transducer according to claim 1, further including a bearing element having a spherically shaped surface portion and a flat surface portion supported within said housing on the opposite side of said measuring element from said pressure transmission member, the flat surface portion of said bearing element contacting said measuring element whereby said measuring element is supported between said bearing element and said pressure transmission member.

5. A measuring transducer according to claim 4, further including a second ring-shaped diaphragm, said second ring-shaped diaphragm being connected at its outer periphery to said housing and having its inner periphery in sealing engagement with said spherically shaped surface portion of said bearing element, said second ring-shaped diaphragm exerting a biasing force on said bearing element whereby said bearing element and said pressure transmission member are force biased against one another with said measuring element sandwiched therebetween.

6. A measuring transducer according to claim 4, wherein said bearing element, said measuring element and said pressure transmission member are combined to form a unitary structure, the spherical surface portion of said bearing element being formed with meridian grooves in which electric conductors for said measuring element are disposed.

7. A measuring transducer according to claim 1, wherein said transducer housing is in the form of a cylindrical casing, whereby the end portion thereof may accommodate ring-shaped diaphragms of different internal diameters, depending upon the actual dimension of said casing.

8. A measuring transducer according to claim 1, wherein said measuring element is cylindrically shaped and has flat parallel surfaces forming the bases of said cylindrical shape, one of said surfaces contacting the flat surface portion of said pressure transmission member.

References Cited

UNITED STATES PATENTS

| | | | |
|---|---|---|---|
| 2,096,826 | 10/1937 | Schrader | 73—115X |
| 2,917,642 | 12/1959 | Wright et al. | 310—8.7X |
| 3,158,763 | 11/1964 | Busch et al. | 310—8.7 |
| 3,271,624 | 9/1966 | Kingma et al. | 310—8.7X |
| 3,341,795 | 9/1967 | Newman et al. | 73—141X |

FOREIGN PATENTS

| | | | |
|---|---|---|---|
| 1,067,240 | 10/1959 | Germany | 73—88.5 |

CHARLES A. RUEHL, Primary Examiner

U.S. Cl. X.R.

73—398R, 517R